United States Patent
Koch et al.

(10) Patent No.: US 7,499,630 B2
(45) Date of Patent: Mar. 3, 2009

(54) METHOD FOR PLAYING BACK MULTIMEDIA DATA USING AN ENTERTAINMENT DEVICE

(75) Inventors: Hartwig Koch, Hildesheim (DE); Frank Naberfeld, Nordstemmen (DE); Frank Hofmann, Hildesheim (DE); Torsten Mlasko, Pattensen (DE)

(73) Assignee: Robert Bosch GmbH, Stuttgart (DE)

( * ) Notice: Subject to any disclaimer, the term of this patent is extended or adjusted under 35 U.S.C. 154(b) by 817 days.

(21) Appl. No.: 10/474,392

(22) PCT Filed: Mar. 30, 2002

(86) PCT No.: PCT/DE02/01166

§ 371 (c)(1),
(2), (4) Date: Mar. 26, 2004

(87) PCT Pub. No.: WO02/085021

PCT Pub. Date: Oct. 24, 2002

(65) Prior Publication Data

US 2004/0153178 A1 Aug. 5, 2004

(30) Foreign Application Priority Data

Apr. 18, 2001 (DE) ................. 101 19 067

(51) Int. Cl.
*H04N 7/00* (2006.01)

(52) U.S. Cl. ........................... 386/96; 386/105

(58) Field of Classification Search .............. 386/96, 386/99, 46, 83, 39
See application file for complete search history.

(56) References Cited

U.S. PATENT DOCUMENTS

| 5,867,205 A | 2/1999 | Harrison |
| 2003/0167174 A1* | 9/2003 | Dagtas et al. ............ 704/275 |

FOREIGN PATENT DOCUMENTS

| DE | 101 16 722 | | 2/2003 |
| EP | 0 593 024 | | 4/1994 |
| EP | 0 926 020 | | 6/1999 |
| JP | 10-215196 | | 8/1998 |
| JP | 11-234224 | | 8/1999 |
| JP | 2000-236272 | | 8/2000 |
| JP | 2000-354014 | | 12/2000 |
| JP | 2001-014324 | | 1/2001 |
| WO | WO99/39466 | | 8/1999 |
| WO | WO 99/39466 | * | 8/1999 |
| WO | WO 00/22825 | | 4/2000 |
| WO | WO00/59223 | | 10/2000 |

* cited by examiner

*Primary Examiner*—Robert Chevalier
(74) *Attorney, Agent, or Firm*—Kenyon & Kenyon LLP

(57) ABSTRACT

A method for playing back multimedia data using an entertainment device, priorities for a corresponding classification of multimedia data being assigned based on a user profile. The multimedia data is then played back based on the priorities and the availability of the multimedia data. The multimedia data may be received or read out from a memory. An electronic program guide makes a timed recording of multimedia data possible.

20 Claims, 4 Drawing Sheets

METHOD FOR PLAYING BACK MULTIMEDIA DATA USING AN ENTERTAINMENT DEVICE

BACKGROUND INFORMATION

It is already known from non-prepublished German Patent Application No. 101 16 722 that multimedia data has a feature such as a program type (PTY) or a description file as in MPEG7 according to which it is possible to prepare a user profile.

SUMMARY OF THE INVENTION

The method according to the present invention for setting an entertainment device has the advantage that a personalized playback of multimedia data is made possible. It is thus virtually possible to create a personalized radio, which is implemented via the user profile and priority assignment. The entertainment device is capable of compiling a program for playback both from received multimedia data as well as from stored multimedia data.

This increases the convenience for a user, personalizes the output and also results in a presentation of multimedia data that is time-independent. Digital Audio Broadcasting (DAB) in particular is suitable as a broadcast transmission method for the transmission of multimedia data. Such data may be broadcast either as objects or as streams. In this case, it is also easy in particular to assign content descriptions and tags to the multimedia data. The user profile is then used as a filter to filter out the corresponding multimedia data. If different multimedia data having the same priority is found or is available, the multimedia data found first is accepted for playback.

It is advantageous in particular that the multimedia data is received using digital radio signals. It is then possible to compile a personalized radio program from the multimedia data presently available. The multimedia data may be received via mobile radiotelephone or via radio.

Moreover, it is an advantage that the multimedia data is stored based on the user profile in order to be able to play it back at a later time. This makes time-independent playback of the multimedia data possible.

It is also an advantage that the entertainment device according to the present invention is switched on according to information from an electronic program guide and multimedia data is then stored and/or played back based on the user profile. This also facilitates timed recording, which is also feature-independent, of multimedia data of interest to a user.

It is also an advantage that when the system is muted, multimedia data having a high priority is played back despite the muting. This makes it possible for data that is of particular importance to a user to be made available to him immediately. It is a further advantage that the multimedia data is linked together based on the classification and it is thus possible to play back related multimedia data in sequence.

It is also an advantage that the multimedia data is stored hierarchically in a directory structure corresponding to its classification in the entertainment device. The addition of more subdirectories makes it possible to obtain a more detailed differentiation from parent directories having a general classification. This makes the analysis particularly simple.

Finally, it is also an advantage that an entertainment device is present for implementing the method according to the present invention, the device having a processor for analyzing and decoding the multimedia data based on the user profile, a memory for storing the multimedia data and the user profile, a speaker, a display, a reception device and an input device.

DETAILED DESCRIPTION

Many electronic devices are becoming increasingly individualized by personal settings. In entertainment devices in particular, where a multitude of programs is available, such individualization is extremely helpful for a user. Therefore, according to the present invention, a method for playing back multimedia data using an entertainment device is described, the multimedia data being prioritized based on the classification of such multimedia data, thus, for example, an accompanying description, and the multimedia data is then played back based on the priorities and availability. It is possible to select received multimedia files as well as multimedia data stored on a data medium at any time. A priority assignment thus makes it possible to differentiate between genres, sources and other parameters.

Figure 1:
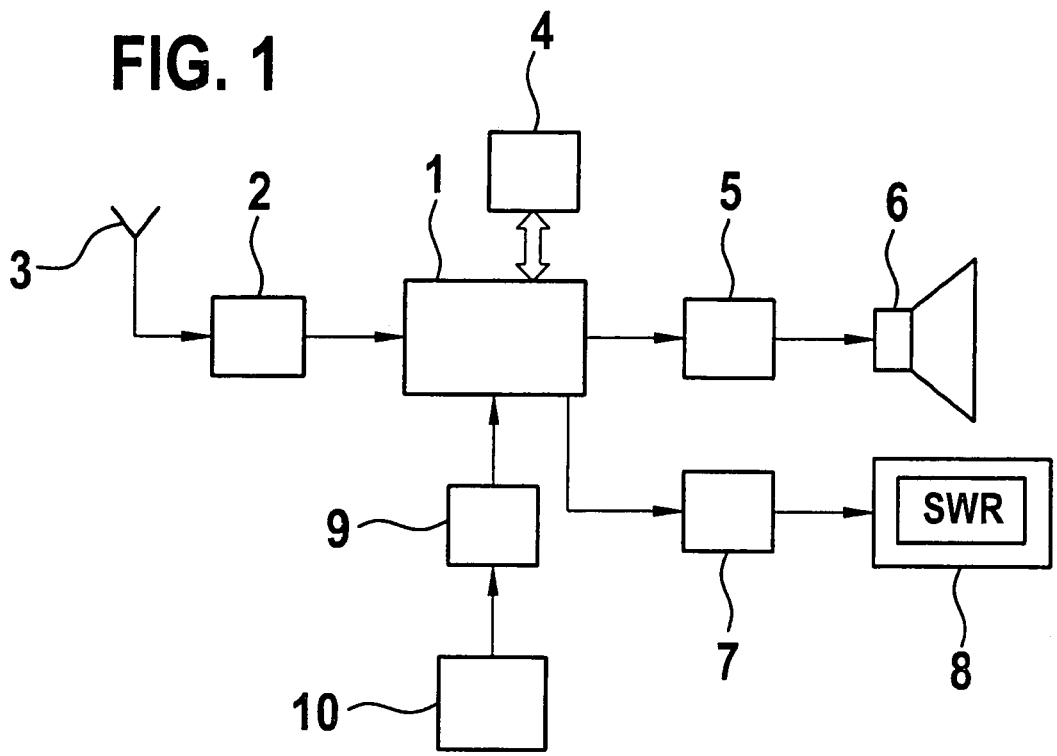
FIG. 1 shows a block diagram according to the entertainment device of the present invention.

FIG. 1 shows an entertainment device according to the present invention in the form of a block diagram. The entertainment device is understood to be a car radio, a portable device for playing back from sound carriers, including, if applicable, a radio receiver or home receiving system, i.e., a stereo system including a tuner.

An antenna 3 is connected to an input of a radio receiver 2. Radio receiver 2 is connected to a processor 1 via a data output. Processor 1 is connected to a memory 4 via a data input/output. A storage medium is present in memory 4, for example, a hard disc, a CD or a multimedia card (MMC). Via a first data output, processor 1 is connected to a signal processing unit 5, which activates a speaker 6. Via a second data output, processor 1 is connected to a signal processing unit 7, which activates a display 8. Via a second data input, processor 1 is connected to a signal processing unit 9, which processes signals from an input device 10.

Using input device 10, a user enters his personal priorities for different classifications of the multimedia data in a user profile, the classifications being established and being added to the multimedia data by the broadcaster or the manufacturer. In doing so, he may choose, for example, that traffic reports be labeled to have the highest priority, followed by normal news, then classical music and finally commentaries. As a function of this, processor 1 searches in the available data sources (receive and memory) for available multimedia data that satisfies these criteria. If the entertainment device receives current traffic reports via antenna 3 and radio receiver 2, these traffic reports are switched through and played back via speaker 6. If neither traffic reports nor any other news is available, classical music is then searched for. Classical music may be received in the form of multimedia data via antenna 3 and radio receiver 2 and it may be obtained from memory 4 as well. In this connection, the multimedia data may be pure audio data as just described; however, it may also be video, graphic or text data.

Digital Audio Broadcasting (DAB) is used here as a broadcast transmission method. DAB is a multicarrier method, which in particular makes it possible to broadcast nearly any form of multimedia data by broadband digital and unidirectional transmission. Other broadcast transmission methods that may also be used here are Digital Video Broadcasting (DVB) and Digital Radio Mondiale (DRM). Using such digital broadcast transmission methods, an electronic program guide (EPG) is occasionally also broadcast, making it possible to time the multimedia device according to the present invention to switch on and off. Based on the user profile, the multimedia data in such a time window is then either stored in memory 4 or presented directly via speaker 6 or display 8. If memory 4 is full, it is then possible for multimedia data that is to be stored to overwrite stored multimedia data having a lower priority.

Many entertainment devices have a mute function via a mute button. The present invention now provides the possibility of assigning priorities in the user profile that ignore muting and are therefore played back despite it. This may be used for traffic reports, for example, so that they may be played back despite muting, thus enabling the user to obtain necessary information nonetheless.

Figure 2:
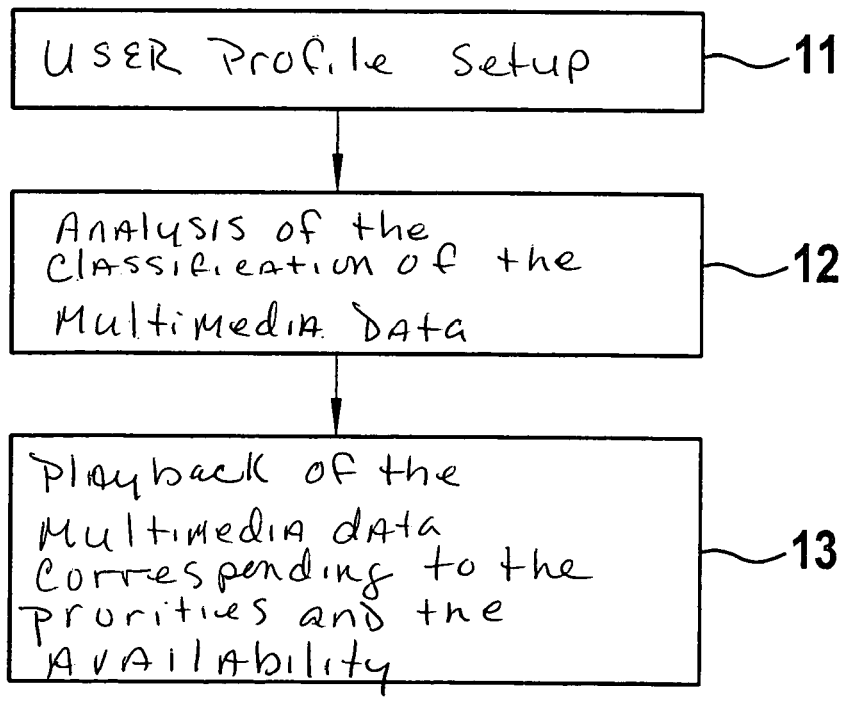
FIG. 2 shows a first flowchart of the method according to the present invention.

A first flowchart of the method according to the present invention is shown in FIG. 2. In step 11, the user uses input device 10 and display 8, in which his information is displayed and assistance is provided, to set up his user profile. In doing so, he assigns priorities as described above for different classification features of the multimedia data. In step 12, processor 1 then analyzes the classification of the available multimedia data based on this user profile. The availability depends on the multimedia data stored in memory 4, i.e., a data carrier drive such as a DVD, CD or mini-disc or also via the received multimedia data that has been received via digital broadcast signals. Instead of digital broadcast signals, it is of course also possible to use digital radio signals such as mobile radio telephone signals for this purpose. The multimedia data selected in step 12 is played back in step 13, corresponding to the priorities and the availability.

The multimedia object transfer (MOT) protocol comes into question for the transmission of multimedia data in object form for DAB. The content may be classified by object name, a directory path, by metadata (MOT header extensions) or objects to be additionally described or by a combination of such parameters. Objects in this context are thus understood to be a self-contained unit such as a file. In the case of multimedia data in streaming format, such as a radio program, the classification may be made using static and in particular dynamic DAB program types (PTY) during broadcasting.

Moreover, an EPG as described above may be used for the timed recording of parts of the multimedia data. In this connection, a trigger signal is advantageous in starting and stopping the recording, for example, with the assistance of the PTYs. The storage of the streaming multimedia data results in the creation of multimedia object data. The multimedia data may be present as individual files or as streams. If the storage volume in memory 4 is low, multimedia data may also be erased corresponding to the priorities specified in the profile.

The multimedia data may also be played back dynamically within the framework of the user profile. If, for example, the user now enters the category stock market, all available objects falling under the category stock market are presented based on how up-to-date they are. The user is able to control whether the switch of categories is automatic or random. Through randomness in particular, a synthetic radio program is suggested. It is further possible that a reference to other objects present in the current program is displayed or made clear to the user during the playback of the multimedia data, for example, a link to an object. This makes it possible to jump to more extensive, expanded multimedia data which, for example, offer additional information, similar or related news or E-commerce possibilities. This additional information may also be stored in the multimedia data itself and thus made additionally clear. As explained, the multimedia data may be presented as audio, e.g., MPEG1 or MPEG2, layer 1 through 3, AAC, RealAudio, text to speech or as video (MPEG2, MPEG4, still images with JPEG, GIF images, HTML pages that are displayed for a specific period of time).

Memory 4 in the entertainment device is built up from a DAB data stream. As described above, other sources are also conceivable, for example, digital television, mobile radio communications or simply a data medium in order to provide the database. Beyond that, various device profiles should be specified in order to cover the various device classes and capabilities, e.g., only audio with one line of text or complete graphics and video capability of the entertainment device.

For example, it is shown below how it is possible to implement a personalized radio using the entertainment device according to the present invention. All titles of the radio programs of a DAB ensemble, approximately 6, are classified, described and/or broadcast with a trigger signal. The entertainment device stores all titles from all radio programs that match the user profile, for example, rock music from the seventies and eighties. In addition, the weather and stock market news that are broadcast as independent multimedia objects using MOT are stored. Together with pieces of music from a local CD, a personalized radio program with current weather information and stock market prices is generated. Using a hit or washout button function, some titles are played especially frequently or are permanently erased.

Figure 3:
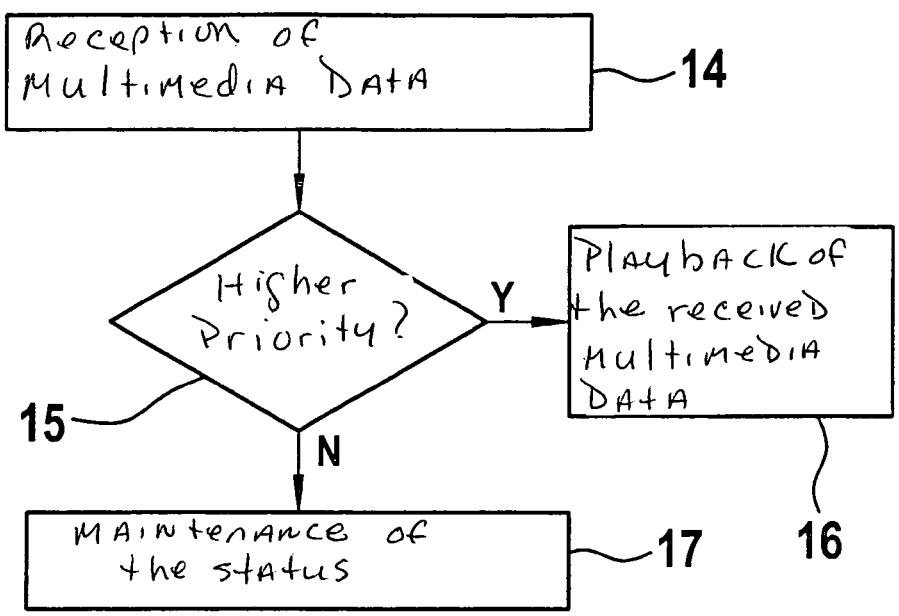
FIG. 3 shows a second flowchart of the method according to the present invention.

A second flowchart of the method according to the present invention is shown in FIG. 3. Multimedia data is received in step 14. In step 15, it is checked if the received multimedia data has a higher priority than the multimedia data presently being played back, from a CD, for example. If this is the case, the received multimedia data is played back in step 16; if it is not the case, then the status of the entertainment device is maintained in step 17.

Figure 4:
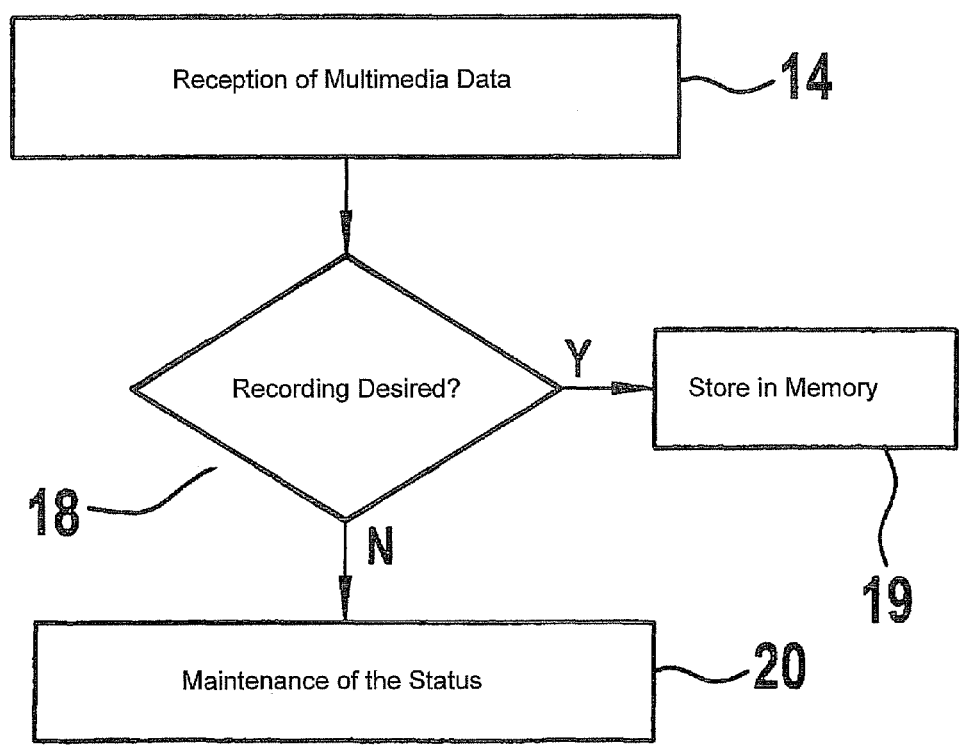
FIG. 4 shows a third flowchart of the method according to the present invention.

A third flowchart of the method according to the present invention is shown in FIG. 4. Multimedia data is again received in step 14. In step 18, it is checked if a recording is desired at this point in time. If this is the case, the received multimedia data is stored in step 19; if it is not the case, the status of the entertainment device is maintained in step 20. Performing a recording at precisely the right time requires a trigger signal which is transmitted with the broadcast signals. This trigger signal is broadcast for the start and the end of the multimedia data.

Figure 5:
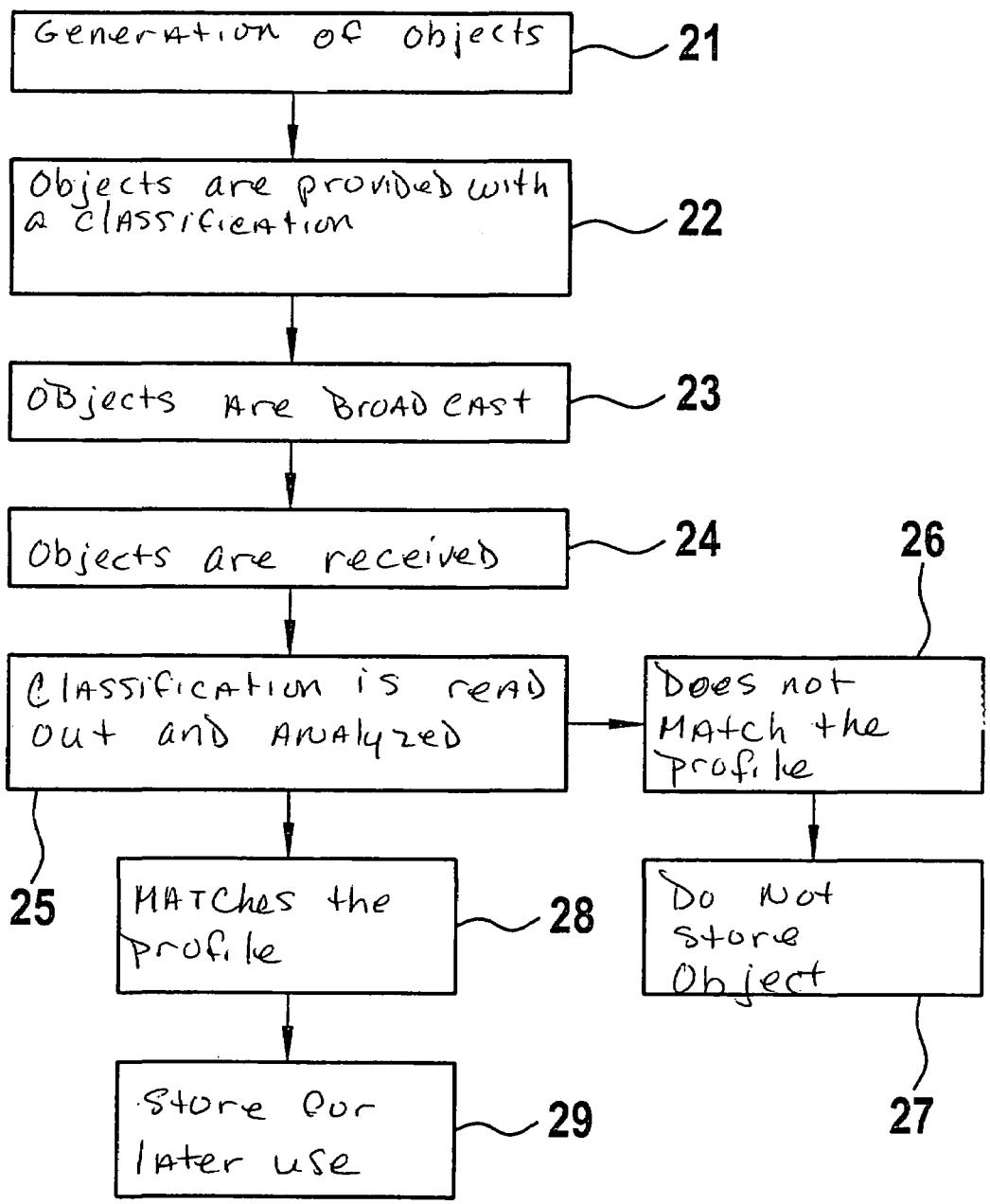
FIG. 5 shows a fourth flowchart of the method according to the present invention.

A fourth flowchart of the method according to the present invention is shown in FIG. 5. In this case, the object is to store multimedia data matching the user profile. In step 21, the broadcaster generates the multimedia data as objects or combines them into a stream. In step 22, the objects are provided in the broadcaster with a classification, i.e., a description of the content, or the existing one is supplemented. In step 23, the objects are broadcast. In step 24, the objects are received. On the receiver side, the objects are then read out and analyzed with respect to the classification in step 25. If it is determined in step 26 that the classification is not specified in the user profile, processor 1 then decides in step 27 that the objects will not be stored. If, however, it is determined in step 28 that the classification is included in the user profile, then the objects are stored in memory 4 in step 29.

What is claimed is:

1. A method for playing back audio signals using an entertainment device, the audio signals for reproduction being one of (a) taken from a memory of the entertainment device and (b) obtained from received digital radio signals, the method comprising:
providing stored audio signals with a classification in the memory while a classification is assigned to audio signals in a radio signal obtained from the received radio signals;
making a selection of the audio signals based on the classification based on a user profile specified by a user and stored in the entertainment device in that a priority is assigned for a particular classification;
playing back the audio signals based on a particular priority and an availability of the audio signals in the received digital radio signal and in the memory of the entertainment device; and
based on the user profile, playing back, audibly in a muted entertainment device, audio signals obtained from radio signals as a function of the classification.

2. The method according to claim 1, wherein the audio signals include at least one of voice and music signals.

3. The method according to claim 1, further comprising storing the audio signals based on the user profile.

4. The method according to claim 1, further comprising automatically switching on and off one of a playback and record mode of the entertainment device according to an electronic program guide included in the received radio signal, and one of storing and playing back audio signals based on the user profile.

5. The method according to claim 1, wherein a trigger signal is included in the received radio signals via which the entertainment device is switched on and off.

6. The method according to claim 1, further comprising linking audio signals based on the classification.

7. The method according to claim 1, further comprising storing the classification hierarchically in a directory structure in the entertainment device.

8. An entertainment device for playing back audio signals, the audio signals for reproduction being one of (a) taken from a memory of the entertainment device and (b) obtained from received digital radio signals, the entertainment device comprising:
a processor for analyzing and decoding the audio signals based on a user profile specified by a user;
a memory for storing the audio signals and the user profile;
a speaker;
a display;
a reception device for receiving the audio signals;
an input device; and
based on the user profile, playing back, audibly in a muted entertainment device, audio signals obtained from radio signals as a function of the classification.

9. The entertainment device according to claim 8, wherein the audio signals include at least one of voice and music signals.

10. The entertainment device according to claim 8, wherein the audio signals are stored based on the user profile.

11. The entertainment device according to claim 8, wherein one of a playback and record mode of the entertainment device is automatically switched on and off according to an electronic program guide included in the received radio signal, and wherein audio signals are one of stored and played back based on the user profile.

12. The entertainment device according to claim 8, wherein a trigger signal is included in the received radio signals via which the entertainment device is switched on and off.

13. The entertainment device according to claim 8, wherein audio signals are linked based on the classification.

14. The entertainment device according to claim 8, wherein the classification is hierarchically stored in a directory structure in the entertainment device.

15. The entertainment device according to claim 8, wherein:
the audio signals are stored based on the user profile;
one of a playback and record mode of the entertainment device is automatically switched on and off according to an electronic program guide included in the received radio signal, and audio signals are one of stored and played back based on the user profile;
audio signals are linked based on the classification; and
the classification is hierarchically stored in a directory structure in the entertainment device.

16. The entertainment device according to claim 15, wherein the audio signals include at least one of voice and music signals.

17. The entertainment device according to claim 15, wherein a trigger signal is included in the received radio signals via which the entertainment device is switched on and off.

18. The method according to claim 1, further comprising:
storing the audio signals based on the user profile;
automatically switching on and off one of a playback and record mode of the entertainment device according to an electronic program guide included in the received radio signal, and one of storing and playing back audio signals based on the user profile;
linking audio signals based on the classification; and
storing the classification hierarchically in a directory structure in the entertainment device.

19. The method according to claim 18, wherein the audio signals include at least one of voice and music signals.

20. The method according to claim 18, wherein a trigger signal is included in the received radio signals via which the entertainment device is switched on and off.

* * * * *